United States Patent Office 3,657,385
Patented Apr. 18, 1972

---

3,657,385
LACTAM BLOCK COPOLYMERS
Markus Matzner, Edison, and James E. McGrath, Somerville, N.J., assignors to Union Carbide Corporation, New York, N.Y.
No Drawing. Filed Oct. 12, 1970, Ser. No. 80,221
Int. Cl. C08g 41/04, 20/00
U.S. Cl. 260—857 R    13 Claims

ABSTRACT OF THE DISCLOSURE

Block copolymers are prepared from lactam monomers and polyarylene polyethers. The polymers are prepared in a lactam anionic polymerization reaction using an alkaline catalyst and a polyarylene polyether as an activator or initiator.

BACKGROUND OF THE INVENTION

(1) Field of the invention

The invention relates to block copolymers prepared from lactam monomer and polyarylene polyethers, as well as to the preparation of such block copolymers in an anionic polymerization system.

(2) Description of the prior art

Polyarylene polyethers and lactam polymers are known to those in the art and may be prepared by various procedures. The lactam polymers, for example, may be prepared hydrolytically or anionically. In the anionic polymerization of the lactam monomers there is usually employed a catalyst-initiator system. The catalyst is usually a material which will form an alkali or alkaline earth metal salt of the lactam. The initiators or activators that have been used to date include a variety of compounds including some which contain recurring aromatic groups such as those disclosed in U.S. 3,016,367 and 3,207,713. The lactam polymers which have been prepared to date from $\epsilon$-caprolactam monomer, however, generally, have disadvantages in that they possess relatively low heat distortion temperatures and they are very sensitive to moisture. This latter property has a deleterious effect upon the electrical insulation properties of such polymers. These polymers are also not thermally stable at $\leqq 125°$ C. for more than a few days. The polyarylene polyether materials which are commercially available to date also have disadvantages in that they are prone to stress-cracking in a variety of media, they lack resistance to various chemicals and they require unusually high molding temperatures.

SUMMARY OF THE INVENTION

Novel block copolymers are prepared from lactam monomers and polyarylene polyether materials. The block copolymers are prepared in anionic polymerization systems which contain an anionic catalyst and certain polyarylene polyethers as initiators or activators. The polyarylene polyether forms a block of the resulting lactam polymer.

An object of the present invention is to provide novel block copolymers from lactam monomer and polyarylene polyethers.

A further object of the present invention is to provide novel polymers based on lactam monomers and polyarylene polyethers which have properties which are substantially superior to those previously available in lactam polymers and polyarylene polyethers.

Another object of the present invention is to provide a novel anionic polymerization system for use in the anionic polymerization of lactam monomers.

DESCRIPTION OF THE PREFERRED EMBODIMENT

It has now been found that novel block copolymers may be prepared from lactam monomer and polyarylene polyethers by anionically polymerizing the lactam monomer with a catalyst-initiator system which comprises, as the initiator or activator, one or more of certain polyarylene polyethers. The resulting block copolymers have substantially improved processability, as well as stress-crack and chemical resistance when compared with unmodified polyarylene polyethers, and they have substantially improved thermal and oxidation resistance properties when compared with unmodified polylactams.

The lactams.—The lactams which may be used according to the present invention are all those which are capable of being polymerized anionically and are preferably those lactam monomers which contain at least one ring group of the structure

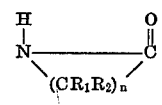

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2 - pyrrolidone, 2-piperidone, 6-methyl-2 - piperidone, $\epsilon$-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bis-lactams such as alkylene bis-lactams of the formula:

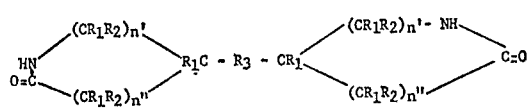

wherein $n'$ and $n''$ are each whole numbers such that $n'$ and $n''$ are each to 14; $R_1$ and $R_2$ are as defined above; and $R_3$ may be $C_1$ to $C_4$ alkylene such as methylene, ethylene, propylene, and butylene; phenylene and substituted phenylene; O and S.

Other lactams having a plurality of ring structures include bicyclic lactams, such as those represented by the formulae:

The lactams to be polymerized can be used individually or in any combination thereof.

The initiator.—The initiator which is to be employed in the preparation of the block copolymers of the present invention is a polymeric material which is commonly known as a polyarylene polyether. The polyarylene polyethers which are contemplated for use in the present invention have molecular weights of the order of about 800 to 100,000.

The initiator of the present invention has the structure:

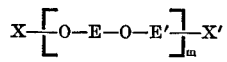

wherein

X is H, R, COHal, COOR, —Ar—Hal, —Ar—OR,

—Ar—COHal, —Ar—COOR, —Ar—OCOOR

—Ar—SO₂Hal, —Ar—SO₃R, SO₂—Ar—Hal

—Ar—OH —Ar—CO—Ar—Hal, —Ar—SO₂—Ar—Hal

—Ar—SO₂—Ar—OR, —AR—SO₂—Ar—OH,

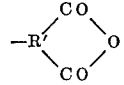

—R'(COOR)₂, —R'(COHal)₂, —R'''—COOR

—R'''—COHal, —R'''—NCO, —Ar—NCO

—Ar—R'''—NCO, —R'''—SO₂NCO, —Ar—SO₂NCO or —Ar—R'''—SO₂NCO,

X' is Hal, NCO, OH, OR, OCOHal, SO₂Hal, SO₂NCO, —AR—OH, COHal, COOR, —Ar—Hal, —Ar—OR,

—Ar—COHal, —Ar—COOR, —Ar—OCOOR

—Ar—SO₂Hal, —Ar—SO₃R, SO₂—Ar—Hal

—Ar—CO—Ar—Hal, —Ar—SO₂—Ar—Hal

—AR—SO₂—Ar—OH, —Ar—SO₂—Ar—OR,

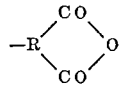

—R'(COOR₂, —R'''—COHal, —R'(COHal)₂

—R'''—COOR, —R'''—NCO, —Ar—NCO

—Ar—R'''—NCO, —R'''—SO₂NCO, —Ar—SO₂NCO or —Ar—R'''—SO₂NCO,

Hal is Cl, F, Br or I; Ar is either a divalent heterocyclic moiety residue containing carbon and oxygen, or nitrogen or sulfur atoms in its ring structure, or Ar is a divalent mono- or polynuclear aryl moiety residue, R, R''' and R' are mono-, di- and trivalent, respectively, $C_1$ to $C_{20}$ hydrocarbon radicals; $m$ is a whole number of about 2 to 500 and E and E' are as defined below.

The R, R''', R' and Ar radicals may also be substituted with inert substituents, i.e., substituents which will not react with any of the components of the polymerization systems of the present invention, or with any of the polymers made therewith.

The term $C_1$ to $C_{20}$ hydrocarbon includes all saturated or unsaturated hydrocarbon radicals containing 1 to about 20 carbons and which are mono-, di- or trivalent, such as aliphatic radicals, such as methyl, methylene, methylidyne, ethyl, vinylene, vinyl, ethynyl, ethylidyne, propyl, isopropenyl, propenyl, propylidene, cyclopropyl, isopropyl, butyl, cyclobutyl, butenyl, isobutyl, amyl, isoamyl, cyclopentyl, hexyl, isohexyl and cycloheptyl; aromatic radicals such as phenyl, phenylene, methylphenylene, tolyl, benzyl, styryl, benzylidene, cumenyl, biphenyl, biphenylyl, biphenylylene, naphthyl, and naphthylene; and heterocyclic radicals such as pyridyl, pyridylidene and furfuryl.

The term heterocyclic moiety residue means the heterocyclic residue of a heterocyclic compound and the term aryl moiety residue means the carbocyclic residue of an aryl compound, which may be mono- or polynuclear in nature.

Where more than one Hal, R, R''', R' and/or Ar are present in the structure of an initiator such radicals may be the same or different.

E is the residuum of a dihydric phenol and E' is the residuum of a benzenoid compound having an inert electron withdrawing group in at least one of the positions ortho and para to the valence bonds, and both of said residua are valently bonded to the ether oxygen atoms through aromatic carbon atoms.

The residua E and E' are referred to in this manner since the polyarylene polyether polymer is conveniently made by the reaction of an alkali metal double salt of a dihydric phenol and a dihalobenzenoid compound having the electron withdrawing group by techniques as described herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols" such as, for example, the 2,2-bis-(4-hydroxyphenyl)propane, 1,1-bis-(4-hydroxyphenyl)-2-phenyl ethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—),

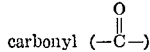

sulfide (—S—),

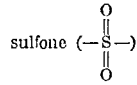

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of γ-pinene, and the like bisphenols where the hydroxyphenyl groups are bound to the same or different carbon atoms of an organic linking group.

Such dinuclear phenols can be characterized as having the structure

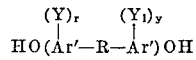

wherein Ar' is an aromatic group, and preferably is a phenylene group, Y and $Y_1$ can be the same or different inert substituent groups such as alkyl groups having from 1 to 4 carbon atoms, halogen atoms, i.e. fluorine, chlorine, bromine, or iodine, or alkoxy radicals having from 1 to 4 carbon atoms, $r$ and $z$ are integers having a value of from 0 to 4, inclusive, and R is representative of a bond between aromatic carbon atoms as in dihydroxydiphenyl, or is a divalent radical, including for example, inorganic radicals such as

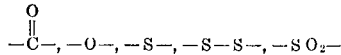

and divalent organic hydrocarbon radicals such as alkylene, alkylidene, cycloaliphatic, or the halogen, alkyl, aryl or like substituted alkylene, alkylidene and cycloaliphatic radicals as well as aralkylene, alkarylene and aromatic radicals and a ring fused to both Ar' groups.

Examples of specific dihydric polynuclear phenols include among others: the bis-(hydroxyphenyl)alkanes such as 2,2-bis-(4-hydroxyphenyl)propane,
2,4'-(dihydroxydiphenyl)methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane, 2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like;

Di(hydroxyphenyl)sulfones such as bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as bis-(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO₂—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Burnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine, or (b) Divalent groups which can activate displacement of halogens on two different rings, such as the sulfone group —SO₂—; the carbonyl group —CO—; the vinyl group

sulfoxide group —SO—; the azo-group —N=N—; the saturated fluorocarbon groups —CF₂CF₂—; organic phosphine oxides

where R is a hydrocarbon group, and the ethylidene group $$X-\underset{-\overset{\|}{C}-}{\overset{}{C}}-X$$

where X can be hydrogen or halogen or which can activate halogens on the same ring such as with difluorobenzoquinone, 1,4- or 1,5- or 1,8-difluoroanthraquinone.

If desired, the polyarylene polyether polymers may be made with mixtures of two or more dihalobenzenoid compounds each of which has this structure, and which may have different electron withdrawing groups. Thus the E' residuum of the benzenoid compounds in the polyarylene polyether polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred polyarylene polyether initiators are those wherein E is the residuum of a dinuclear dihydric phenol and E' is the residuum of a dinuclear benzenoid compound. These preferred initiators then are composed of recurring units having the formula

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y₁ each represent inert substituent groups selected from the group consisting of halogen, allyl groups having from 1 to 4 carbon atoms and alkoxy groups having from 1 to 4 carbon atoms and where r and z are integers having a value from 0 to 4 inclusive. Even more preferred are the polyarylene polyether initiators of the above formula wherein r and z are zero, R is a divalent connecting radical

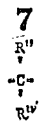

wherein R" represents a member of the group consisting of hydrogen, lower alkyl, lower aryl, and the halogen substituted groups thereof, and R' is a sulfone group.

A preferred class of the I initiators are those wherein the X—O— and —X' moieties are substituted in para positions on terminal aryl groups in E and E' respectively, or wherein the X and X' radicals contain aryl groups which have Hal, $SO_2$Hal, COHal, $SO_3$R, COOR, OCOOR,

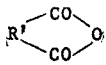

NCO or $SO_2$NCO groups in para substituent positions. Such class of the I initiators are preferred since they usually provide for the fastest rates of polymerization.

The most preferred of the polyarylene polyether initiators of the present invention are compounds having the structure

II

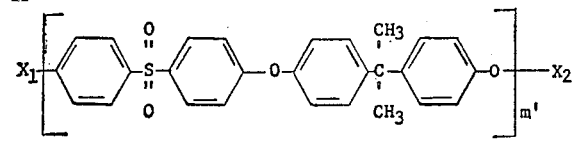

wherein $X_1$ is OH, Cl, $OCH_3$, $X_2$ is H, 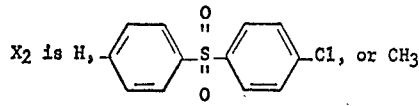 Cl, or $CH_3$ and $m'$ is an integer of about 5 to 100.

These II initiators are polymeric materials having molecular weights of about 2000 to 45,000 and they are commonly known as polysulfone resins. These II initiator materials are preferably prepared by reacting the sodium salt of bisphenol A with 4,4'-dichlorodiphenylsulfone. In such a reaction an excess of the latter compound is used to insure the presence of chlorine terminals, and an excess of the former compound is used to insure the presence of hydroxyl terminals after neutralization. The chlorine terminated materials provide substantially faster polymerization reactions than the hydroxyl terminated materials.

The preparation of the initiators having the I and II structures is more fully disclosed in U.S. 3,434,919; U.S. application No. 688,302 filed Dec. 6, 1967; and in U.K. 1,078,234. The I and II structure type initiators may also be prepared by oxidative coupling reactions as disclosed by A. S. Hay in Advances in Polymer Science, 4, 496 (1967); and by electrophilic substitution reactions as disclosed by J. I. Jones in J. Macromol. Chem. C 2, (2), 303 (1968).

The polymers.—The block copolymers of the present invention are block copolymers of the AB and ABA types, wherein A represents a block of lactam polymer and B represents the polyarylene polyether block. In the usual case these two types of block copolymers are concurrently prepared in the polymerization reaction. These two types of block copolymers may also be represented by the structures

III

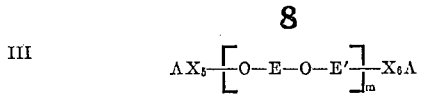

for the ABA copolymers and

IV(a)

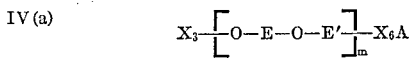

and

IV(b)

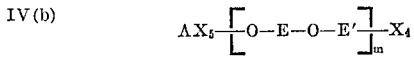

for the AB type block copolymers.

And wherein A, E, E' and $m$ are as defined above, and $X_3$ and $X_4$ are terminal groups such as X, X', $X_1$ and $X_2$ as defined above, $X_5$ and $X_6$ are residues of the reaction between the initiator terminals X and X', respectively, and the salt of the lactam being polymerized. For example, when X is ArHal and X' is Hal, then $X_5$ is Ar and $X_6$ is a chemical bond.

The A chains of lactam monomer attach to the initiator at the site of, and upon the removal during the initiating reaction of, all or part of one or both of the terminal groups.

Most of the above described X and X' terminal groups are active enough to serve as initiating sites, although with a given polymeric initiator not all of such individual X and X' sites will react. In the case where X is H, R or ArOR and X' is OH or OR these terminal groups are not very reactive, per se. Where such groups are present it is believed that a scission of the chain of the polymeric initiator takes place, with the creation of a more active terminal group at the site of the cleaved polymer chain, as will be discussed further below.

A typical initiating reaction is believed to proceed in two steps as follows:

(1)

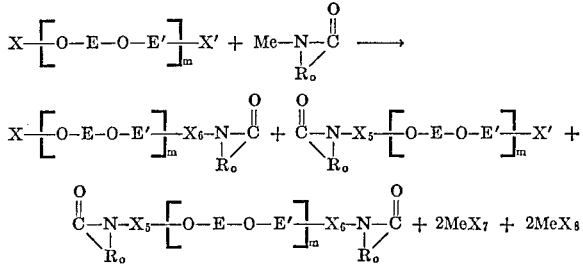

(2)

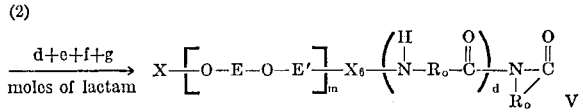

Me is the metal cation of the catalyst.
$R_o$ is that portion of the lactam monomer polymerized which lies between the nitrogen atom and the carbonyl carbon atom of such lactam.

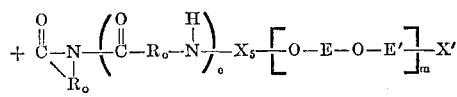
VI

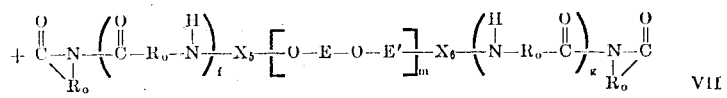
VII wherein V and VI represent AB type block copolymers, VII represents an ABA type copolymer, E, E', $d$, $e$ $f$, $g$, Me and $R_o$ are as defined above, and where

| X or X' is— | X₅ or X₆ is— | and X₇ or X₈ is— |
|---|---|---|
| COHal | CO | Hal |
| COOR | CO | OR |
| —Ar—Hal | Ar | Hal |
| —Ar—OR | Ar | OR |
| —Ar—COHal | Ar—CO | Hal |
| —Ar—COOR | Ar—CO | OR |
| —Ar—OCOOR | Ar—OCO | OR |
| —Ar—SO₂Hal | Ar—SO₂ | Hal |
| —Ar—SO₃R | Ar—SO₂ | OR |
| —SO₂—Ar—Hal | SO₂—Ar | Hal |
| —Ar—CO—Ar—Hal | Ar—CO—Ar | Hal |
| —Ar—SO₂—Ar—Hal | Ar—SO₂—Ar | Hal |
| —Ar—SO₂—Ar—OR | Ar—SO₂—Ar | OR |
| R'(COHal)₂ | 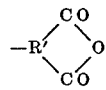 | 2 Hal |
| —R'(COOR)₂ | 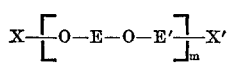 | 2 OR |
| —R'''—COOR | —R'''—CO | OR |
| —R'''—COHal | —R'''—CO | Hal |
| 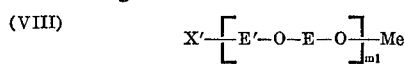 | 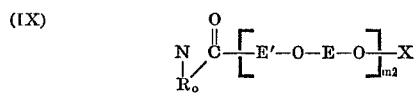 | ------ |
| —R'''NCO | —R'''—NHCO | ------ |
| —Ar—NCO | —Ar—NHCO | ------ |
| —Ar—R'''—NCO | —Ar—R'''—NHCO | ------ |
| —R'''—SO₂NCO | —R'''—SO₂NHCO | ------ |
| —Ar—SO₂NCO | —Ar—SO₂NHCO | ------ |
| —Ar—R'''—SO₂NCO | Ar—R'''—SO₂NHCO | ------ | and where

| X' is— | X₆ is— | X₈ is— |
|---|---|---|
| Hal | (¹) | Hal |
| NCO | NHCO | ------ |
| OCOHal | OCO | Hal |
| SO₂Hal | SO₂ | Hal |
| SO₂NCO | SO₂NHCO | ------ |

¹ Chemical bond.

It is believed that the above listed X and X₁ groups are the only terminal groups which will provide X₅ or X₆ moieties in the resulting polymers. In the cases where X or X' contains an NCO group, or is $$-R'\begin{matrix}CO\\ \diagdown\\ \diagup\\ CO\end{matrix}O$$

no X₇ or X₈ moiety splits off, but the entire X₅ or X₆ moiety is retained in the block copolymer, as noted above.

Under the polymerization conditions which are employed it is believed that chain scission takes place to some extent in all the $$X-\left[O-E-O-E'\right]_m-X'$$

X' initiators. This scission reaction, moreover, as noted above, is believed to be the predominant source of initiating sites when the terminal groups are OH or OR, i.e. X and/or X' are H, R, —AR—OH, —AR—OR, OH, OR or —AR—SO₂—AR—OH, particularly when high polymerization temperatures are used, i.e.≥220° C., and/or when high catalyst concentrations are used, i.e., >2 mol percent of catalyst based on the moles of lactam monomer being polymerized. When such scission reactions occur they are believed to split the chain of the initiator between the E' and the adjoining O moieties therein, and the resulting terminals then become (VIII)   $X'-\left[E'-O-E-O\right]_{m_1}-Me$ and (IX)   $\underset{R_o}{\overset{O}{\underset{\|}{N-C}}}-\left[E'-O-E-O\right]_{m_2}-X$ wherein $m_1 + m_2 = m$.

Species IX is chemically equivalent to those obtained from step (1) above when X' is Hal.

When a terminal group is R, i.e. when X is R, it is believed that the following initiating reaction may also take place

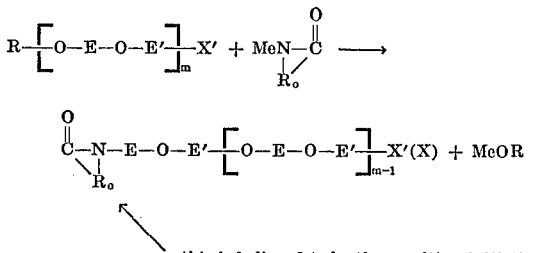

this is believed to be the resulting initiating site

Thus, as a result of the scission reactions, it is believed that when X is H and X' is OH, there is no X₅ or X₆ group present in the resulting block copolymer. After the scission reaction, the initiating reaction continues as otherwise described above.

It can be seen therefore, that one of the important aspects of the present invention is the fact that a variety of initiators are provided for the preparation of lactam polymers all of which initiators are, basically, polyarylene polyether materials, properly terminated. The variation in the initiator species is thus readily obtained merely by changing the terminal group on the polyarylene polyether materials. It is thus possible to prepare block copolymers containing blocks of the lactam polymer and of the polyarylene polyether under various reaction conditions and in various types of reaction equipment. This concept is important because various types of equipment require different types of processing times and polymerization times. Some types of equipment require the use of slower or faster polymerization systems than do other types of equipment. Thus, the so-called "pot life" of the polymerization system is important in lactam polymerization technology. "Pot life" as the term is used herein means that period of time within which a polymerization system is workable, that is, remains in a shapeable consistency. In the polymerization of lactam monomers today it is a common practice to polymerize the monomer in-situ, as in a casting or extrusion polymerization procedure wherein the end product is cast or extruded in an almost one-step operation, simultaneously with the polymerization of the lactam monomer. it is important, therefore, that the catalyst-initiator system for these various types of polymerization procedures be capable of providing the necessary pot life so that the polymerization system can be used in such procedures. When used on a polyarylene polyether initiator of a given molecular weight, the following is a listing of the relative order of the activity of various types of terminal groups:

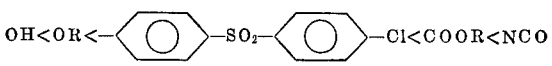

The following chart, moreover, provides an indication of the length of the pot life that might be obtained under different temperature conditions by the use of various of the terminal groups on a polyarylene polyether initiator of the present invention having a molecular weight of about 5,000, using about 0.1 to 3 mol percent of such initiator and about 1 to 2 mol percent of sodium hydride as a catalyst with ϵ-caprolactam monomer.

| Terminal group | Pot life of polymerization systems | | | |
|---|---|---|---|---|
| | 150° C. | 200° C. | 220° C. | 250° C. |
| OH | 5 hrs | 0.5 hr | 15 min | 4–5 min |
| Cl | 45 min | 5 min | 2 min | 1 min |
| COOR | 10 min | 2 min | 0.5 min | ≤0.25 min |
| NCO | 1 min | 0.5 min | 0.25 min | ≤0.1 min |

The block copolymers of the present invention formed from the polyarylene polyethers and lactams disclosed above are unique semi-crystalline materials which have physical properties which are superior in various respects to either a homopolymer of the corresponding lactam or to the polyarylene polyether polymers. They are superior, for example, to the lactam homopolymers because they have higher heat distortion temperatures, particularly in the case where the lactam is ε-caprolactam and the lactam homopolymer is thus a nylon-6 polymer. In such instances of comparison the block copolymers of the present invention would have heat distortion temperatures up to about 60° C. or more higher than the heat distortion temperature of the nylon-6 homopolymer where the block copolymer contains at least 10 to 15 weight percent of the polyarylene polyether as a block of the copolymer. The block copolymers also have lower hydrophilicity and better thermal stability properties than the corresponding lactam homopolymers. The block copolymers are also superior to the polyarylene polyether materials from which they are formed because they have improved stress crack resistance properties and improved resistance to various types of environments. The block copolymers also have improved processability in that they may be processed at temperatures which are up to 100° C. lower than the temperatures at which the polyarylene polyether materials may be processed.

The preferred copolymers of the present invention are those which contain about 20 to 80 weight percent of the lactam monomer in the form of block segments therein, and 80 to 20 weight percent of the polyarylene polyether materials as block segments therein.

The catalyst.—The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triiospropyl aluminum, diisobutyl aluminum hydride, and lithium aluminum hydride.

About 0.2 to 20, and preferably 0.5 to 4, mole percent of catalyst is used per mole of monomer being polymerized.

The catalyst and initiator are employed in a mole ratio to each other of about 2 to 200, and preferably, 3 to 10.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

The polymerization process.—The polymerization reaction is preferably conducted in bulk. Under such bulk polymerization procedures the polyarylene polyether initiator is preferably dissolved in the monomeric lactam. This can be accomplished easily at temperatures between 80° C. and 250° C. When initiators are used which contain less reactive end groups, e.g., hydroxyl or halogen

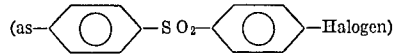

then the solution of initiator in lactam monomer may be stored in the liquid or molten state at temperatures which are slightly above the melting point of the monomeric lactam, i.e., about 70–75° C. for ε-caprolactam monomers, for up to about 40 hours without any appreciable change in the viscosity of the system or potency of the catalyst-initiator system. This provides an unusually long pot life for the molten system at such temperatures. The pot life is shorter at higher temperatures, i.e., between about 80° C. and 130° C. for ε-caprolactam, and at temperatures of about 130°–240° C. the ε-caprolactam polymerization reaction proceeds within a few minutes when using polymeric initiators having such OH and halogen terminals. The reactions will proceed even faster under such temperature conditions when other terminal groups are used on the initiator. The bulk polymerization reaction is usually conducted at atmospheric pressure and at a temperature of about 130 to 260° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 130°–200° C. depending on the lactam(s) employed, the catalyst concentration, and the polymerization temperature. The bulk polymerization reaction should be carried out under anhydrous conditions, i.e., in the presence of no more than about 0.2 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and of destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. 3,061,592 and 3,383,352, and by G. B. Gechele and G. F. Martins in J. Applied Polymer Science, 9, 2939 (1965).

Adjuvants.—The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

The properties of the polymers produced in the examples were determined by the following test procedures:

| Property: | Test procedure |
|---|---|
| Tensile strength, p.s.i. | ASTM D-638 |
| Tensile modulus, p.s.i. | ASTM D-638 |
| Yield strength, p.s.i. | ASTM D-638 |
| Yield elongation, percent | ASTM D-638 |
| Tensile elongation, percent | ASTM D-638 |
| Elongation at break, percent | ASTM D-638 |
| Notched Izod impact ft. lbs./in. of notch | ASTM D-256-56 |
| Heat distortion temperature, ° C. | ASTM D-648-56 |
| Melt flow temperature, ° C. | ASTM D-1238-52T |
| Tg, ° C. | Tex. Res. J., 1955 |

Reduced viscosity.—Reduced viscosity (R.V.) were measured in m-cresol at 25° C. The time taken for the polymer solution to flow in an Ostwald viscometer was compared with the time taken for the pure solvent. The R.V. was calculated from the equation:

$$R.V. = (S.T. - B.T.)/B.T. \quad (1/C)$$

where S.T. is sample time (in seconds), B.T. is blank time (in seconds) and C is concentration in grams/deciliter. The units of the R.V. values are then deciliters/gram.

Pendulum Impact.—Thin film specimens (⅛ inch wide and shear cut from a film of the polymer) were used to measure impact properties. The impact characteristics of the films were determined on a modified Baldwin impact tester. A ¼ in. diameter rod was used as the impacting head of the pendulum. A 1 by ⅛ in. film sample was mounted transverse to the path of the pendulum and located at the bottom of the swing. The ¼ in. rod struck the ⅛ in. face of the sample half way between the ends. The energy to break the sample was determined by the difference between the initial height and the recovery height of the pendulum after it had broken the sample.

$$\text{Pendulum impact ft. lb./in}^3 = \frac{\text{Pendulum energy loss}}{\text{Volume of sample}}$$

Glass transition temperature.—The glass transition temperature was determined on thin film samples by measuring the recovery characteristics as a function of temperature. A film specimen was strained 1% at the rate of 10%/min. and then allowed to return at the same rate. The recovery or resilience was calculated from the ratio of the recovered length to original length. This test was repeated at elevated temperatures. A programmed rate of heating of 1.5–2° C./min. was used, measurements being repeated at intervals of 3–5° C. The glass transition temperature Tg is defined as the minimum in a plot of resilience versus temperature.

Tm, or melting point.—This is the temperature that can be determined from the modulus-temperature curves and at which the tensile modulus has a value of 100 p.s.i. This temperature is often referred to as $T_2$ instead of Tm.

EXAMPLE I

Synthesis of chlorine terminated polysulfone

To a five liter, four neck Morton flask fitted with dropping funnel, thermometer, Argon inlet, mechanical stirrer, water separator and condenser were added 343.0 grams (1.50 moles) of Bisphenol-A, 2000 ml. of chlorobenzene and 1000 ml. of dimethyl sulfoxide. After the solution became homogeneous and was well purged with argon, 122.8 grams of 97.9% sodium hydroxide (3.0 moles) was added as a 50% freshly made solution in boiled, distilled water. An anhydrous solution of the Bisphenol-A sodium salt in a predominantly dimethyl sulfoxide media was obtained by azeotropic distillation of the chlorobenzene and water. After 2½ hours of distillation, the pot temperature had reached 153° C. and a clear, amber and somewhat viscous solution was obtained. At this point 448.28 grams of 4,4'-dichlorodiphenylsulfone (1.5625 mole) (a 4 mole percent excess) was added as a hot 50% solution in dry chlorobenzene. The 4,4'-dichlorodiphenylsulfone was added over an eight minute period so that the chlorobenzene could distill without lowering the pot temperature below 150° C. The polycondensation reaction started immediately as evidenced by a change in color from amber to golden yellow. The reaction temperature was adjusted to 160° C. and, within 30 minutes, the solution viscosity was much higher. After 1½ hours at 160° C. the viscosity was only slightly more higher but the solution color was now a greenish-yellow. This color is typical for the polysulfone polymer prepared with excess 4,4'-dichlorodiphenylsulfone. After a total reaction time of two hours and 20 minutes, the heating mantle was removed and while the system was cooling, 1000 ml. of chlorobenzene was added to reduce the solution viscosity. The cooled polymer solution was filtered through Celite diatomaceous earth then coagulated in methanol. The precipitated polymer was washed twice with methanol and once with water in a Waring Blendor. The white polymer was vacuum dried at 100° C. for 24 hours and 125° C. for 4 hours. The yield was 620 grams (94%) and the R.V. (0.2% in CHCl$_3$ at 25° C.) was 0.318 dl./gm. The latter value suggested a molecular weight ($\overline{M}n$) of around 12,000 gm/mole. The chlorine analysis on polymer redried 4 hours at 130° C. under vacuum was 0.53 ±.01% (duplicate determinations) which agrees well with that which would be expected for a $\overline{M}n$ of 12,000 (0.59%).

EXAMPLE II

Synthesis of higher molecular weight chlorine terminated polysulfone

Chlorine terminated polysulfone of higher molecular weight (R.V.=0.55 dl./gm., 0.2% CHCl$_3$ at 25° C.) than that prepared in Example I was prepared as in Example I. The one important difference being that 1½ mole percent excess of 4,4'-dichlorodiphenylsulfone was employed rather than 4 mole percent. The R.V. value of the polymer produced in this example is equal to a $\overline{M}n$ of 25–30,000 g./mole. This polymer, when molded at 250° C., gave an exceptionally water white transparent plaque.

EXAMPLE III

Preparation of a block polymer containing 75% weight of poly (ε-caprolactam)

To a dry, 500 ml., 3 neck flask fitted with a mechanical stirrer, Argon inlet-tube, a 3-way Teflon stopcock attached to a condenser, and a graduated receiver, were added 56.6 gms. (4.72×10$^{-3}$ moles) of the chlorine-terminated oligomer produced in Example I, 100 ml. of chlorobenzene, and 220 ml. of freshly distilled ε-caprolactam (1.95 moles=220 gms.). Stirring and circulation of dry Argon were started. The solution was heated (oil-bath) and 95% of the chlorobenzene was distilled off (time of distillation: 1.5 hours). A substantially dry solution of the oligomer in the lactam was left in the flask as the residue.

In a separate, dry 100 ml. flask fitted with a magnetic stirrer, thermometer, an Argon-inlet tube, and a condenser were placed 30 ml. of distilled ε-caprolactam. Heating of this material was accomplished via a heating mantle. The temperature of the molten lactam was kept at 130° C., dry Argon was circulated over its surface, and 0.4 gms. (0.8 gm. of a 50–50 by weight dispersion in mineral oil) of NaH (1.67×10$^{-2}$ moles) was added to it. Rapid (~10 min. total time) evolution of hydrogen took place and yielded a clear solution of the catalyst.

Twenty-nine and one half milliliters of this catalyst solution (1.64×10$^{-2}$ moles) were now transferred via syringe to the oligomer solution in ε-caprolactam. The oil-bath temperature was kept at 175° C. A rapid increase in viscosity was observed and at the end of a 23 minute period the mixture was solid. Heating was continued for another 9 minutes at which time the reaction was considered complete. The resulting block copolymer product was cooled under Argon. The cold copolymer product recovered from the flask, after breaking it up, was highly crystalline and tough. A mechanical saw and a mechanical grinder were used in order to break the material into small particles. The yield of this crude product was quantitative. Its R.V. (0.1 gm./100 ml. m-cresol, 25° C.) was 2.53 dl./gm. A tough, flexible film was compression molded from this block copolymer at 250° C.

Physical properties of this film were:

Tensile strength—9,000 p.s.i.
Tensile modulus—67,000 p.s.i.
Elongation at break—360%
Pendulum impact—>360 ft. lbs./in.$^3$
Tg—50° C.
T$_2$(Tm)—205° C.

The environmental stress-crack resistance of this block copolymer was excellent. The copolymer withstood a stress of 3,000 p.s.i. in acetone, ethyl acetate, mixtures of toluene/heptane, locktite, and trichloroethylene with no deterioration of mechanical properties after periods of ≥10 minutes. Polysulfone deteriorates in these media at stresses of ≤500 p.s.i.

The crude material was now extracted with ~2 liters of 0.5% formic acid at 60° C. for 2 hours. After filtration, the precipitate was washed twice for 5 minutes with 2 liters of distilled water. The product was filtered and dried at 100° C. under 40–50 mm. vacuum for 16 hours.

The washed material was submitted to a Soxhlet extraction with chloroform for 20 hours. Chloroform is a good solvent for polysulfone but does not dissolve the block copolymer. The extracted material was vacuum dried till constant weight at 100° C. The yield of chloroform-insoluble block copolymer was 90.2%. The R.V. (0.1 g./100 ml.; m-cresol, 25° C.) of the copolymer was 3.5 dl./gm. Elemental analysis gave 9.7% N and 1.45% S which corresponds to 78% wt. of nylon 6 in the block copolymer. Tough films possessing excellent environmental stress crack resistance properties comparable to such properties as were described above for the crude material were obtained on compression-molding at 250° C.

Physical properties of compression molded film made from the purified block copolymer were:

R.V. (0.1 g./100 ml., m-cresol at 25° C.)—2.59 dl./gm.
Tensile modulus—220,000 p.s.i.
Tensile strength—8,000 p.s.i.
Elongation at break—90–200%
Pendulum impact—132 ft. lbs./in.$^3$
Tg—50° C.
T$_2$ (Tm)—205° C.
Estimated heat distortion temperature—55° C.

The observed difference in the tensile moduli between the crude and extracted materials is due to the removal of plasticizing impurities (solvent, monomer, lactam, unreacted oligomer). The solubilities are given:

Polysulfone is soluble in: chlorinated aliphatics, chlorinated aromatics, etc. The copolymer is insoluble in almost all common solvents, except such powerful solvents as m-cresol, o-chlorophenol and α-naphthol, etc. The high crystallinity of the nylon 6 segments in the copolymer is responsible for the low solubility and excellent environmental stress-crack resistance characteristics of the block copolymer.

EXAMPLE IV

Example III repeated with a 1:1 by weight charge of chlorine-terminated polysulfone and ε-caprolactam The apparatus and experimental conditions were essentially the same as in Example III. The same (as in Example III) chlorine-terminated polysulfone polymer was used.

The amounts of materials used were 56.6 gms. (4.7×10$^{-3}$ moles) of the polysulfone polymer, 100 ml. of chlorobenzene, 56.5 gms. mole) of ε-caprolactam, and 0.4 gms. (1.67×10$^{-2}$ moles) of NaH (as 0.8 gram of 1:1 by weight dispersion in mineral oil). The yield of crude block copolymer was 100%. The crude block copolymer had good environmental stress-crack resistance properties and it was formed in the polymerization reaction system within 20 minutes at 170° C.

The crude product was extracted with methanol in a Soxhlet. Methanol is a non-solvent for the copolymer but dissolves readily the residual chlorobenzene, unreacted ε-caprolactam and some of the low molecular weight oligomers. After a 20 hour extraction the yield of insoluble material was 89%. The latter was a white crystalline solid. It was compression-molded at 250° C. to a film that had the following properties:

Tg—165° C.
T$_2$ (Tm)—210° C.
Tensile modulus—230,000 p.s.i.
Yield strength—6,900 p.s.i.
Tensile strength—6,900 p.s.i.
Yield elongation—5.5%

Elongation at break—38%
Pendulum impact—78 ft. lbs./in.$^3$
Estimated heat distortion temperature—140–145° C.

The polymer flowed freely at 300° C. Its R.V. prior to molding, in m-cresol, at 25° C. (0.1 gm./100 ml.) was 2.50. Elemental analysis gave 7.27% N and 3.25% S. This corresponds to 58.5% weight of nylon 6 in the product.

The methanol-extracted material was now submitted to a 20 hour Soxhlet extraction with chloroform. A yield of 73.6% of insoluble block polymer was obtained. The latter gave on elementary analysis 9.88% N and 1.22% S. This corresponds to 79.5% by weight of nylon 6 blocks in this block copolymer. The copolymer was molded at 250° C. (5' minutes) to tough films which displayed good environmental stress aging characteristics and good mechanical properties.

EXAMPLE V

Example III was repeated at a polymerization temperature of 210° C. Polymerization took place within three minutes. The R.V. (0.1 gm./100 ml.; m-cresol; 25° C.) of the resulting block copolymer was 2.62 dl./g.

EXAMPLE VI

Synthesis of the block copolymer in a continuous manner using a vented extruder

The copolymer of this invention can be continuously and rapidly prepared in an extruder as described below.

A three neck five liter flask (Flask A) fitted with stirrer, argon inlet, condenser, mantle, 3-way Teflon stopcock, graduated receiver and with a bottom outlet stopcock was set up. To this argon purged flask were charged 2,500 ml. of chlorobenzene and 2,000 grams of ε-caprolactam. After heating to 120° C., 1,000 grams of Cl terminated polysulfone resin (molecular weight of 25–30,000 gm./mole, chlorine content 0.2%) was charged. After 1½ hours at 130° C., a homogeneous solution of the polysulfone in chlorobenzene plus ε-caprolactam was achieved. The chlorobenzene was now removed by distillation to insure that the system was anhyrous. A maximum temperature of 220° C., was required to remove 99+% of the chlorobenzene.

In a separate, dry five liter flask (Flask B) 2,000 grams of ε-caprolactam were melted under argon. After the liquid had been held at 110° C. for thirty minutes under a fast stream of dry argon, 4.25 gm. of sodium hydride (7.45 gm. of a 57% mineral oil dispersion, 0.177 mole) were added. Within five minutes a homogeneous solution of sodium caprolactam in ε-caprolactam had formed.

Flask A (held at 190° C.) and Flask B were now connected to a mechanical pumping system leading to a single screw extruder. The two streams were thus fed to the extruder where they were mixed and polymerized. The temperature profile in the extruder started at 200° C., and reached a maximum of 250° C. The residence time of the mixed stream in the extruder varied between about 2 to 5 minutes depending on the pumping rate. The output rate in this experiment was found to be 1016 grams/hour. The resulting tough block copolymer strand was cooled in air or water and cut into pellets. After a water extraction to remove unreacted monomer (24 hours, Soxhlet), followed by drying (100° C., 20 hours, ~50 mm. Hg), the block copolymer was found to contain 80% nylon 6 by nitrogen analysis. The reduced viscosity in m-cresol at 0.1% and 25° C., was 1.41 dl./gm. The dried pellets could be compression molded to a tough flexible film.

EXAMPLE VII

The preparation of the block copolymer in a casting experiment

It is possible to prepare a finished part of the block copolymer via a cast polymerization directly into a mold. This has some obvious desirable feature such as the elimination of intermediate stranding and fabrication steps. A solution of 30 grams of polysulfone resin in 100 ml. of ε-caprolactam was prepared as described in Example VI. The solution was added to a 160° C., preheated (oil bath) 25× 200 ml. cylindrical glass tube. Then 0.42 gm. of a 57% by weight sodium hydride in mineral oil dispersion (0.24 gm. sodium hydride 0.01 mole) were added. A clear solution then formed within five minutes. After twenty minutes the viscosity became very high and the polymer began to crystallize. The polymerization was allowed to continue for one hour. By this time the polymer crystallization was complete and the sampe had separated away from the glass vessel. The cylindrical specimen, after cooling, was milled into the form of a rectangular test bar. It was rigid and tough. The heat distortion temperature at 264 p.s.i. was found to be 109° C. and the Izod impact was 1.0 ft. lbs./in. notch.

EXAMPLE VIII

The example illustrates the preparation of a block copolymer of the present invention using a hydroxyl terminated polysulfone polymer as the initiator.

The polysulfone initiator used was a dihydrovy terminated material having molecular weight of about 5,000. The reactions were conducted in bulk at temperatures of the order of about 195 and 240° C.

In a bulk reaction which was conducted at 195° C. 75 weight percent of ε-caprolectam and 25 weight percent of the polysulfone material was admixed with one mole percent, based on the amount of ε-caprolactam, of sodium hydride and the system was then subjected to polymerization temperature of 195° C. It required 33 minutes under these reaction conditions to provide the resulting block copolymer. When extracted with boiling methanol for 24 hours the resulting polymer was shown to contain 15 weight percent of methanol extractables. After being thus extracted the resulting block copolymer had a reduced viscosity of 2.78 dl./gm. (as a 0.1 gm./100 ml. solution in m-cresol at 25° C.).

A second charge of 75 weight percent of ε-caprolactam and 25 weight percent of the polysulfone material was heated until the monomer and polymer was soluble in each other and then 3 mol. percent of sodium hydride based on ε-caprolactam were charged to the polymerization system. The polymerization system was heated to 237° C. and a polymerization time of 8 minutes was required in order to provide the desired block copolymer. The resulting block copolymer had a reduced viscosity, prior to methanol extraction procedures, of 0.70 dl./gm. When extracted with boiling methanol for 24 hours the polymer showed a methanol extractable value of 18%. The methanol extracted polymer had a reduced viscosity of 0.93 deciliters per gram (as a 0.1 gram per 100 ml. solution in m-cresol at 25° C.).

The polymer prepared at 195° C. was compression molded at ~2000 lbs. per square inch and at a temperature of about 240° C. to form a plaque which had the following physical properties:

Tensile modulus—146,000 p.s.i.
Tensile strength—7,500 p.s.i.
Elongation at break—160%
Pendulum impact—133 foot lbs. per cu. in.

These results indicate that the chain cleavage initiation reaction give products of quality that are essentially the same as those of the polymeric materials that are formed from polysulfone initiators having chlorine terminals.

EXAMPLE IX

Example III was repeated using a hydroxyl-(instead of chlorine) terminated polysulfone. Chlorobenzene was used as the solvent. The amounts of the reactants used were: 10 gms. of an OH terminated polysulfone having a molecular weight of 5,400 (1.85×10$^{-3}$ moles); 20 ml.

of chlorobenzene; 28.3 gms. (0.25 mole) of ε-caprolactam; 0.12 gm. of NaH (5×10⁻³ moles). At a temperature of 155° C., it took 75 minutes before any viscosity change was noticeable in the polymerization system. The polymer began to crystallize after 120 minutes at 155° C. and the polymerization was allowed to continue for 5 hours. The resulting block copolymer had an R.V. (0.1 gm./100 ml.; m-cresol, 25° C.) of 1.35 dl./gm., and a nylon block content of 71% by weight as determined by nitrogen analysis.

EXAMPLES X TO XX

A series of 11 polymerization experiments were conducted in solution as disclosed in Example III above to form block copolymers from ε-caprolactam and chlorine terminated polysulfone resins. Sodium hydride was used as the catalyst. Table A below lists the amounts of reactants used, and the polymerization times and temperatures employed in each of the reactions. The polysulfone resins used as initiators had various molecular weights as indicated by the reduced viscosity (R.V.) values (as 0.2 gram polymer per 100 ml. CHCl₃ at 25° C.) listed in Table A for such initiators.

Table B below lists various of the solution properties of the block copolymers prepared in Examples X to XX as well as the percent by weight of nylon-6 blocks in such copolymers. The percent weight of nylon-6 blocks was based on the percent nitrogen in the methanol insoluble fraction of the polymers. The methanol insoluble (24 hours inboiling methanol) fraction usually represents the high molecular weight block copolymers of the present invention. The water and chloroform extractions were also conducted for 24 hours in the boiling solvent. The ε-caprolactam monomer and nylon-6 oligomers are soluble in both boiling water and boiling methanol, but boiling methanol is more effective than boiling water in the removal of residual amounts of the chlorobenzene which is used as a polymerization solvent and azeotropic drying agent. The block copolymer and nylon-6 are insoluble in chloroform, whereas the polysulfone resins are completely soluble in this solvent.

The reduced viscosity values were measured on the methanol extracted samples of the block copolymers, as 0.1 gram of polymer per 100 ml. of m-cresol at 25° C.

Table C below lists various of the physical properties of the copolymers produced in Examples X to XX. The physical property values were measured on samples of the copolymers which had been extracted with methanol. The physical property values were obtained on test specimens of the copolymers which were prepared by compression molding the dried copolymer at 250° C. between aluminum foil.

Where the percent chloroform extractables are relatively low, the chloroform extraction is not necessary since substantially all the polysulfone initiator is incorporated in the block copolymer, and the physical properties of the methanol extracted samples are representative of the true copolymer.

TABLE A.—POLYMERIZATION CONDITIONS FOR EXAMPLES X TO XX

| Example | ε-Caprolactam, weight percent | Polysulfone Weight percent | R.V. | NaH, mole percent | Polymerization Time, minutes | Temp., °C. |
|---|---|---|---|---|---|---|
| X | 50 | 50 | 0.32 | 2 | 90 | 170 |
| XI | 50 | 50 | 0.32 | 3.2 | 20 | 170 |
| XII | 50 | 50 | 0.32 | 3.5 | 20 | 170 |
| XIII | 50 | 50 | 0.32 | 2.0 | 27 | 170–180 |
| XIV | 50 | 50 | 0.5 | 2 | 30 | 175 |
| XV | 64 | 36 | 0.32 | 1.2 | 30 | 180 |
| XVI | 80 | 20 | 0.26 | 1.1 | 60 | 170 |
| XVII | 76 | 24 | 0.5 | 1.4 | 5 | 190 |
| XVIII | 80 | 20 | 0.26 | 1.1 | 3 | 210 |
| XIX | 80 | 20 | 0.26 | 1.0 | 30 | 180 |
| XX | 45 | 55 | 0.38 | 0.8 | 35 | 170 |

TABLE B.—SOLUTION PROPERTIES AND PERCENT BY WEIGHT OF NYLON-6 BLOCKS IN COPOLYMERS OF EXAMPLES X TO XX

| Copolymer of example | R.V. | Percent by weight insolubles in— H₂O | CH₃OH | CHCl₃ | Percent by weight nylon-6 blocks |
|---|---|---|---|---|---|
| X | | | 89 | | 47.8 |
| XI | 1.37 | 94.3 | | | |
| XII | 2.50 | | 89.5 | 73.6 | 58.5 |
| XIII | 1.20 | 91.3 | 90 | 71.1 | 55 |
| XIV | 1.53 | | | 45 | |
| XV | 1.77 | | 90 | | 55 |
| XVI | 4.3 | | 90.9 | 89.2 | 78.5 |
| XVII | | | 92.0 | | 73 |
| XVIII | 2.62 | | 89 | | 72 |
| XIX | | | 89.5 | | |
| XX | 1.45 | | 86 | | |

TABLE C.—PHYSICAL PROPERTIES OF BLOCK COPOLYMERS OF EXAMPLES X TO XX

| Copolymer of example | Tensile modulus, p.s.i. | strength, p.s.i. | Elongation, percent | Pendulum impact, ft. lb./in.³ |
|---|---|---|---|---|
| X | 170,000 | 6,000 | 5 | 9 |
| XI | 120,000 | 9,700 | 300 | 120 |
| XII | 230,000 | 6,900 | 38 | 78 |
| XIII | 145,000 | 5,800 | 41 | 25 |
| XIV | 149,000 | 7,500 | 150 | 200 |
| XV | 160,000 | 8,100 | 105 | 120 |
| XVI | 122,000 | 6,800 | 200 | 124 |
| XVII | 120,000 | 7,200 | 171 | 180 |
| XVIII | 126,200 | 7,110 | 112 | 220 |
| XIX | 274,000 | 8,130 | 105 | |
| XX | 220,000 | 7,960 | 11 | 36 |

What is claimed is:

1. An improved process for preparing a block copolymer by anionically polymerizing lactam monomer with anionic lactam polymerization catalyst and anionic lactam polymerization initiator which comprises using as said initiator at least one polyarylene polyether said polyarylene polyether having recurring units of the structure $$\left[ -\text{O}-\text{E}-\text{O}-\text{E}'- \right]_m$$

wherein E is the residuum of a dihydric phenol, E' is the residuum of a benzenoid compound having an inert electron withdrawing group in at least one of the positions ortha and para to the valence bonds, both of said residua being valently bonded to the ether oxygen atoms in said structure through aromatic carbon atoms, and m being a whole number of about 2 to 500.

2. A process as in claim 1 in which said polyarylene polyether has the structure

X—[O—E—O—E']—X'

X is H, R, COHal, COOR, —Ar—Hal, —Ar—OR, —Ar—COHal, —Ar—COOR, —Ar—OCOOR, —Ar—SO₂Hal, —Ar—SO₃R, SO₂—Ar—Hal, —Ar—OH, —Ar—CO—Ar—Hal,

—Ar—SO₂—Ar—Hal, —Ar—SO₂—Ar—OR
—Ar—SO₂—Ar—OH,

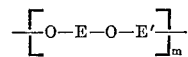

—R'(COOR)₂, —R'(COHal)₂, —R'''—COOR, —R'''—COHal, —R'''—NCO, —Ar—NCO, —Ar—R'''—NCO, —R'''—SO₂NCO,

—Ar—SO₂NCO and —Ar—R'''—SO₂NCO

X' is Hal, NCO, OH, OR, OCOHal, SO₂Hal, SO₂NCO,

—Ar—OH, COHal, COOR, —Ar—Hal, —Ar—OR, —Ar—COHal, —Ar—COOR, —Ar—OCOOR, —Ar—SO₂Hal, —Ar—SO₃R, SO₂—Ar—Hal,

—Ar—CO—Ar—Hal, —Ar—SO₂—Ar—Hal, —Ar—SO₂—Ar—OH, —Ar—SO₂—Ar—OR

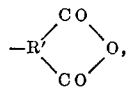

—R'(COOR)$_2$, —R'(COHal)$_2$, —R'''—COOR,
—R'''—COHal, —R'''—NCO, —Ar—NCO,
—Ar—R'''—NCO, —R'''—SO$_2$NCO
—Ar—SO$_2$NCO and —Ar—R'''—SO$_2$NCO Hal, is Cl, F, Br or I, Ar is a divalent mono- or polynuclear aryl moiety residue or a divalent heterocyclic moiety residue containing carbon and oxygen or nitrogen or sulfur in its ring structure, R, R''' and R' are mono-, di- and trivalent, respectively, $C_1$ to $C_{20}$ hydrocarbon radicals, and $m$ is a whole number of about 2 to 500.

3. A process as in claim 2 in which said polyarylene polyether has the structure $$X_1 - \left[ \phenyl - \underset{O}{\overset{O}{S}} - \phenyl - O - \phenyl - \underset{CH_3}{\overset{CH_3}{C}} - \phenyl - O \right]_{m'} - X_2$$

wherein $X_1$ is OH, Cl, or OCH$_3$ $X_2$ is H, —phenyl—S(O)$_2$—phenyl—Cl, or CH$_3$ and $m'$ is an integer of about 5 to 100.

4. A process as in claim 3 wherein $X_1$ is Cl and $X_2$ is

—phenyl—S(O)$_2$—phenyl—Cl.

5. A process as in claim 3 wherein $X_1$ is OH and $X_2$ is H.

6. A process as in claim 1 in which the lactam monomer comprises ε-caprolactam.

7. A process as in claim 1 which is conducted in a shaping device with the simultaneous shaping of the resulting polymer.

8. A block copolymer comprising at least one block of lactam polymer and at least one block of polyarylene polyether said block of polyarylene polyether having repeating units of the structure $$-\left[ O-E-O-E' \right]_m-$$

wherein E is the residuum of a dihydric phenol, E' is the residuum of a benzenoid compound having an inert electron withdrawing group in at least one of the positions ortho and para to the valence bonds, both of said residua being valently bonded to the ether oxygen atoms in said structure through aromatic carbon atoms, and $m$ being a whole number of about 2 to 500.

9. A block copolymer as in claim 8 which is an AB or ABA block copolymer wherein A represents the lactam polymer block and B represents the polyarylene polyether block.

10. A block copolymer as in claim 9 in which A represents a block of ε-caprolactam polymer.

11. A block copolymer as in claim 9 having one of the structures $$\underset{R_o}{\overset{O}{C}}-N-\left(\underset{R_o}{\overset{O}{C}}-R_o-\underset{H}{\overset{H}{N}}\right)_{n'}-(X_5)-\left[O-E-O-E'\right]_m-(X_6)-\left(\underset{H}{\overset{H}{N}}-R_o-\underset{O}{\overset{O}{C}}\right)_{n'}-N-\underset{R_o}{\overset{O}{C}}, \; X'-\left[O-E-O-E'\right]_m-(X_6)-\left(\underset{H}{\overset{H}{N}}-R_o-\underset{O}{\overset{O}{C}}\right)_{n'}-N-\underset{R_o}{\overset{O}{C}}, \text{ and}$$

$$\underset{R_o}{\overset{O}{C}}-N-\left(\underset{R_o}{\overset{O}{C}}-R_o-\underset{H}{\overset{H}{N}}\right)_{n'}-(X_5)-\left[O-E-O-E'\right]_m-X$$

wherein $R_0$ is that portion of the lactam monomer polymerized which lies between the nitrogen atom and the carbonyl carbon atom of such lactam, $n'$ is a whole number $>1$, $X_5$ is selected from the group consisting of CO, Ar, Ar—CO, Ar—OCO, Ar—SO$_2$, Ar—CO—Ar, Ar—SO$_2$—Ar, SO$_2$—Ar,

R'(CO)(CO), R'''—CO, R'(CO)(COO)

—R'''—NHCO, —Ar—NHCO, —Ar—R'''—NHCO, —R'''—SO$_2$NHCO, —Ar—SO$_2$—NHCO and —Ar—R'''—SO$_2$NHCO, $X_6$ is selected from the group consisting of CO, Ar, Ar—CO, Ar—OCO, Ar—SO$_2$, Ar—CO—Ar, Ar—SO$_2$—Ar, SO$_2$—Ar

R'(CO)(CO), R'''CO

R'(CO)(COO)

—R'''—NHCO, —Ar—NHCO
—Ar—R'''—NHCO, —R'''—SO$_2$NHCO
—Ar—R'''—SO$_2$NHCO, NHCO, OCO, SO$_2$, SO$_2$NHCO, E—O—E', and a chemical bond, X is selected from the group consisting of H, R, COHal, COOR, —Ar—Hal, —Ar—OR, —Ar—COHal, —Ar—COOR, —Ar—OCOOR, —Ar—SO$_2$Hal, —Ar—SO$_3$R, SO$_2$—Ar—Hal, —Ar—CO—Ar—Hal, Ar—OH, —Ar—SO$_2$—Ar—Hal
—Ar—SO$_2$—Ar—OR, —Ar—SO$_2$—Ar—OH,

—R'(CO)(O)(CO)

—R'(COOR)$_2$, —R'(COHal)$_2$, —R'''—COOR,
—R'''—COHal, —R'''—NCO, —Ar—NCO,
—Ar—R'''—NCO, —R'''—SO$_2$NCO
—Ar—SO$_2$NCO and —Ar—R'''—SO$_2$NCO, X' is selected from the group consisting of Hal, NCO, OH, OR, OCOHal, SO$_2$Hal, SO$_2$NCO, COHal, COOR, —Ar—Hal, —Ar—OR, —Ar—COHal,
—Ar—COOR, —Ar—OCOOOR, —Ar—SO$_2$Hal,
—Ar—OH, —Ar—SO$_3$R, SO$_2$—Ar—Hal
—Ar—CO—, —Ar—SO$_2$—Ar—OR, —Ar—SO$_2$—Ar—Hal, —ArSO$_2$—Ar—OH,

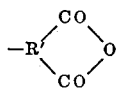

—R'(COOR)$_2$, —R'(COHal)$_2$, —R'''—COOR,
—R'''—COHal, —R'''—NCO, —Ar—NCO,
—Ar—R'''—NCO, —R'''—SO$_2$NCO
—Ar—SO$_2$NCO and —Ar—R'''—SO$_2$NCO, Hal is selected from the group consisting of Cl, F, Br and I, Ar is selected from the group consisting of divalent heterocyclic moiety residues containing carbon and oxygen or nitrogen or sulfur atoms in their ring structures, and divalent mono- or polynuclear aryl moiety residues, R, R''' and R' are mono-, di- and trivalent, respectively, $C_1$ to $C_{20}$ hydrocarbon radicals, and $m$ is a whole number of about 2 to 500.

12. A block copolymer as in claim 9 wherein the polyarylene polyether block has the structure

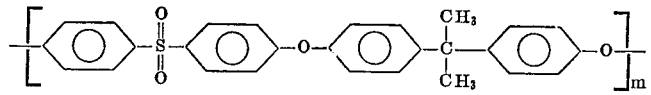

wherein $m$ is an integer of about 5 to 100.

13. A block copolymer as in claim 12 wherein the lactam polymer block is formed from ε-caprolactam.

References Cited
UNITED STATES PATENTS 3,207,713  9/1965  Hyde _____ 260—857
3,316,221  4/1967  Hyde _____ 260—78

PAUL LIEBERMAN, Primary Examiner

U.S. Cl. X.R.

260—47 C, 47 CZ, 47 R, 49, 50, 78 L, 857 G

PO-1050
(5/69)

UNITED STATES PATENT OFFICE
CERTIFICATE OF CORRECTION

Patent No. 3,657,385      Dated April 18, 1972

Inventor(s) M. Matzner et al      -1-

It is certified that error appears in the above-identified patent and that said Letters Patent are hereby corrected as shown below:

Column 2, line 47, --2-- should be inserted after "each".

Column 3, lines 26-29, in the structure, "R" should read ---R'---.

Column 4, line 21, "either" should read --ether--.

Column 4, line 34, "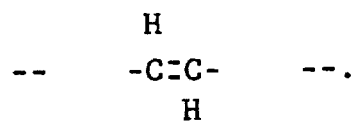pinene" should read --alpha-pinene--.

Column 4, line 40, in the structure, subscript "y" should read --z--.

Column 6, lines 20-21, the vinyl group should read $$-- \quad -\underset{H}{\overset{H}{C}}\!=\!C- \quad --.$$

Column 6, line 70, "allyl" should read --alkyl--.

Column 7, line 48, "3,434,919" should read --3,434,914.

Column 8, lines 57-60 should be inserted on line 74 after "copolymer,"

PO-1050
(5/69)

UNITED STATES PATENT OFFICE
CERTIFICATE OF CORRECTION

Patent No. 3,657,385                    Dated April 18, 1972

Inventor(s)   M. Matzner et al                              -2-

It is certified that error appears in the above-identified patent and that said Letters Patent are hereby corrected as shown below:

Column 8, lines 74-75, "f, g, Me and $R_o$" should read --f, and g--.

Column 9, line 55, "X" should be deleted.

Column 9, lines 71-74, in structure IX a valence bond should be inserted between the nitrogen atom and the carbonyl carbon atom.

Column 10, line 49, "used" should be inserted before "for".

Column 18, line 13, "sampe" should read --sample--.

Column 18, line 24, "dihydrovy" should read --dihydroxy--.

Column 20, line 49, the subscript --m-- should be inserted after the right hand bracket of the structure.

Column 22, line 54 --, -Ar-$SO_2$NHCO-- should be inserted after "-R'''-$SO_2$NHCO".

Column 23, line 2, "-Ar-OCOOOR" should read -- -Ar-OCOOR--.

Column 23, line 5, "-Ar-CO-" should read -- -Ar-CO-Ar-Hal--.

Signed and sealed this 15th day of August 1972.

(SEAL)
Attest:

EDWARD M. FLETCHER, JR.                ROBERT GOTTSCHALK
Attesting Officer                       Commissioner of Patents